United States Patent
Honkasalo et al.

(10) Patent No.: US 11,617,094 B2
(45) Date of Patent: Mar. 28, 2023

(54) MACHINE LEARNING IN RADIO ACCESS NETWORKS

(71) Applicant: Nokia Technologies Oy, Espoo (FI)

(72) Inventors: Zhi-Chun Honkasalo, Kauniainen (FI); Vilho Räisänen, Espoo (FI); Carlos Alcantara, Helsinki (FI); Ahmed Shehata, Espoo (FI)

(73) Assignee: Nokia Technologies Oy, Espoo (FI)

( * ) Notice: Subject to any disclaimer, the term of this patent is extended or adjusted under 35 U.S.C. 154(b) by 94 days.

(21) Appl. No.: 15/930,634

(22) Filed: May 13, 2020

(65) Prior Publication Data

US 2020/0374711 A1 Nov. 26, 2020

(30) Foreign Application Priority Data

May 20, 2019 (EP) ..................................... 19175319

(51) Int. Cl.
*H04W 24/02* (2009.01)
*G06N 3/08* (2023.01)
*H04W 16/22* (2009.01)

(52) U.S. Cl.
CPC .............. *H04W 24/02* (2013.01); *G06N 3/08* (2013.01); *H04W 16/22* (2013.01)

(58) Field of Classification Search
CPC .... G06N 20/10; G06N 3/0445; G06N 3/0454; G06N 3/063; G06N 3/08; H04L 41/044; H04L 41/0823; H04L 41/145; H04L 41/16; H04W 16/22; H04W 24/02; H04W 24/04
See application file for complete search history.

(56) References Cited

U.S. PATENT DOCUMENTS

| | | |
|---|---|---|
| 9,125,146 B1 * | 9/2015 | Edara ................... H04W 48/16 |
| 2006/0048026 A1 | 3/2006 | Fine et al. |
| 2007/0275717 A1 * | 11/2007 | Edge .................... H04W 48/16 |
| | | 455/434 |
| 2016/0359680 A1 | 12/2016 | Parandehgheibi et al. |
| 2018/0018590 A1 * | 1/2018 | Szeto ..................... G06N 20/10 |
| 2018/0316502 A1 | 11/2018 | Nadeau et al. |
| 2018/0373988 A1 | 12/2018 | Dhanyamraju et al. |
| 2019/0102684 A1 | 4/2019 | Beran et al. |

FOREIGN PATENT DOCUMENTS

WO 2018/057302 A1 3/2018

OTHER PUBLICATIONS

Extended European Search Report received for corresponding European Patent Application No. 19175319.3, dated Oct. 25, 2019, 10 pages.

* cited by examiner

*Primary Examiner* — Lester G Kincaid
*Assistant Examiner* — Dung L Lam
(74) *Attorney, Agent, or Firm* — Duft & Bornsen, PC (57) ABSTRACT

According to an example aspect of the present invention, there is provided a method comprising, receiving, from a first data endpoint of a radio access network, a representation of a local model of the first data endpoint of the radio access network, determining multiple common models for endpoints of the radio access network, selecting, based on the representation of the local model of the first data endpoint, one of said multiple common models for the first data endpoint and transmitting the selected common model to the first data endpoint, any other data endpoint or any other external system which utilizes the selected common model.

14 Claims, 7 Drawing Sheets

MACHINE LEARNING IN RADIO ACCESS NETWORKS

FIELD

Example embodiments of the present invention relate in general to communication networks and more specifically to machine learning in radio access networks.

BACKGROUND

Machine Learning, ML, may be exploited for example in cellular communication networks such as in 5G networks. Utilization of ML in a radio access network enables use of adaptable control loops for various use cases, such as Multiple-Input Multiple-Output, MIMO, beam control and optimization, scheduling, dynamic localization and/or closed loop optimization of various radio resource control and allocation decision algorithms. Such enhancements may be used to improve spectral efficiency, network resource utilization and overall network performance. Moreover, algorithms based on Deep Learning, DL, may be exploited to enable use of a unified ML framework for training, applying and managing models.

SUMMARY OF THE INVENTION

According to some aspects, there is provided the subject-matter of the independent claims. Some example embodiments are defined in the dependent claims.

According to a first aspect, there is provided a first method comprising, receiving, from a first data endpoint of a radio access network, a representation of a local model of the first data endpoint of the radio access network, determining multiple common models for endpoints of the radio access network, selecting, based on the representation of the local model of the first data endpoint, one of said multiple common models for the first data endpoint and transmitting the selected common model to the first data endpoint, any other data endpoint or any other external system which utilises the selected common model.

According to the first aspect, the first method may further comprise determining the selected common model based at least partially on the local model of the first data endpoint.

According to the first aspect, the first method may further comprise determining a representation of a local model of a second data endpoint of the radio access network, determining that the local model of the first data endpoint is similar compared to the local model of the second data endpoint and grouping the first and the second data endpoints to a group, wherein the group may be associated with the selected common model. In some embodiments, the first method may further comprise determining the selected common model by averaging parameters of the local model of the first data endpoint and parameters of the local model of the second data endpoint.

According to the first aspect, the first method may further comprise determining a number of common models M, determining representations of local models of N data endpoints and grouping said N data endpoints for said M common models so that each of said N data endpoints is associated with one of said M common models.

According to the first aspect, the representation of the local model of the first data endpoint may comprise information about changed parameters compared to a previous local model of the first data endpoint, and the selected common model is determined based on the changed parameters.

According to a second aspect, there is provided a second method comprising, receiving, from an aggregation unit, a common model for a first data endpoint of a radio access network, selecting a local model of the first data endpoint of the radio access network or the common model, adapting communication parameters based on the selected model and communicating over an air interface using the communication parameters.

According to the second aspect, the second method may further comprise determining that the local model is to be used instead of the common model and using, based on the determination, the local model for communicating over the air interface.

According to the second aspect, the second method may further comprise comparing the local model to the common model and determining, based on the comparison, whether to use the local model or the common model. In some embodiments, the second method may further comprise determining, based on the comparison, that the local model is more accurate than the common model and using, based on the determination, the local model for communicating over the air interface.

According to a third aspect of the present invention, there is provided an apparatus comprising at least one processing core, at least one memory including computer program code, the at least one memory and the computer program code being configured to, with the at least one processing core, cause the apparatus at least to perform the first method.

According to a fourth aspect of the present invention, there is provided an apparatus comprising at least one processing core, at least one memory including computer program code, the at least one memory and the computer program code being configured to, with the at least one processing core, cause the apparatus at least to perform the second method.

According to a fifth aspect of the present invention, there is provided an apparatus comprising means for performing the first method. According to a sixth aspect of the present invention, there is provided an apparatus comprising means for performing the second method.

According to a seventh aspect of the present invention, there is provided non-transitory computer readable medium having stored thereon a set of computer readable instructions that, when executed by at least one processor, cause an apparatus to at least perform the first method. According to an eighth aspect of the present invention, there is provided non-transitory computer readable medium having stored thereon a set of computer readable instructions that, when executed by at least one processor, cause an apparatus to at least perform the second method.

According to a ninth aspect of the present invention, there is provided a computer program configured to perform the first method. According to a tenth aspect of the present invention, there is provided a computer program configured to perform the second method.

EXAMPLE EMBODIMENTS

Example embodiments of the present invention relate to machine learning in radio access networks. More specifically, example embodiments of the present invention enable grouping of endpoints of a Radio Access Network, RAN, by using multiple common models so that each endpoint may be associated with one of said multiple common models. Use of multiple common models enables smaller common model sizes for achieving the same accuracy compared to using a single common model. Alternatively, the accuracy of the used common models may be improved if sizes of the used common model sizes are the same as a size of the single common model, thereby improving the performance. Various trade-offs are naturally possible as well, depending on the size of the used common models.

In addition, a data endpoint may decide whether it wishes to use a common model received from an aggregation unit or a local model of the data endpoint in question. That is to say, a data endpoint may select whether to use the received common model or its local model in inference, e.g., for adapting communication parameters based on the selected model and then communicating over an air interface using the adapted communication parameters.

Figure 1:
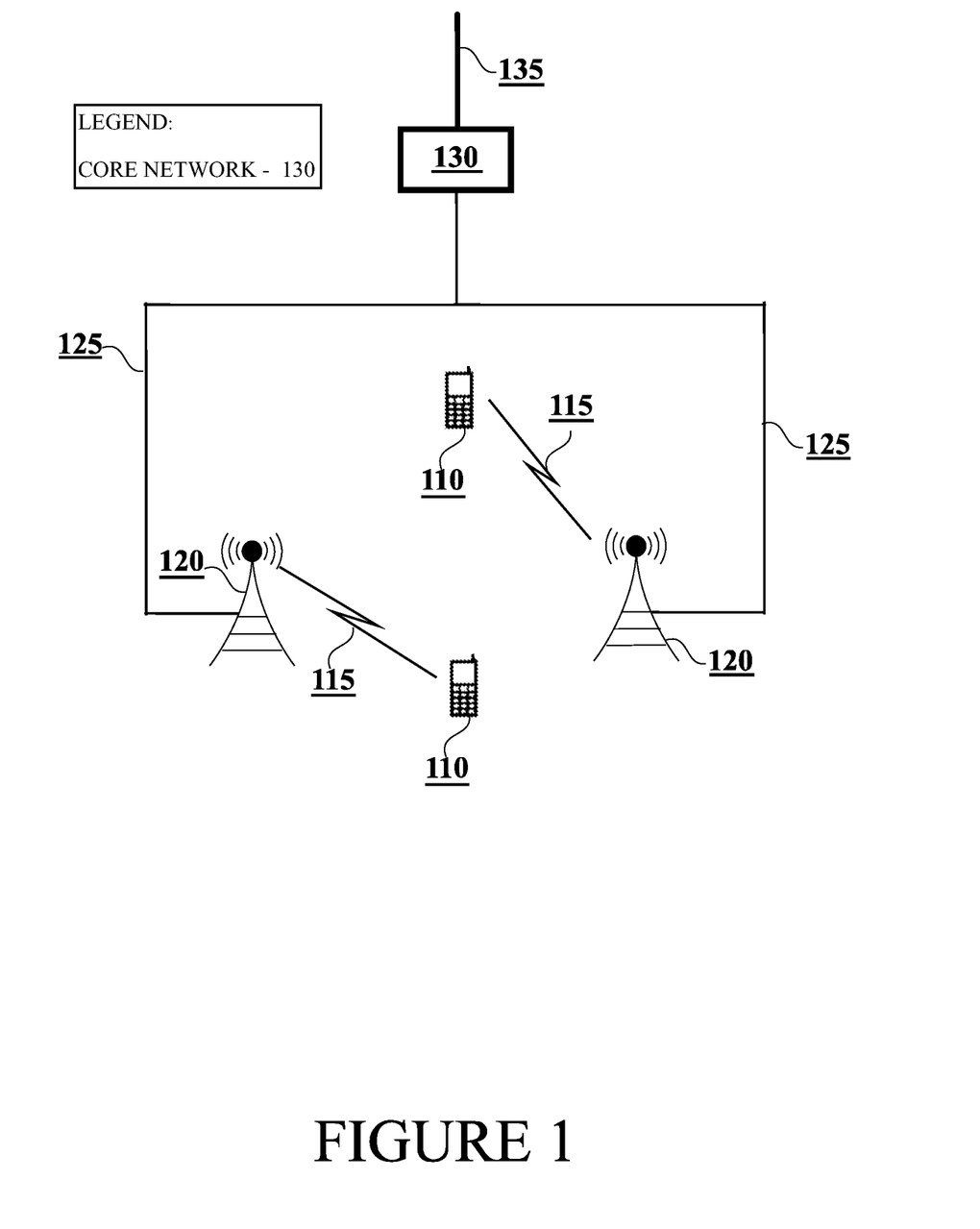
FIG. 1 illustrates an exemplary network scenario in accordance with at least some example embodiments.

FIG. 1 illustrates an exemplary network scenario in accordance with at least some example embodiments. According to the example scenario of FIG. 1, there may be a cellular wireless communication system. The cellular wireless communication system may comprise wireless terminals 110, wireless network nodes 120 and core network 130. Wireless terminals 110 may be connected to, and possibly communicate with, wireless network nodes 120 via air interface 115.

Wireless terminal 110 may be, for example, a smartphone, a cellular phone, a User Equipment, UE, a Machine-to-Machine, M2M, node, Machine-Type Communications, MTC, node, an Internet of Things, IoT, node, a car telemetry unit, a laptop computer, a tablet computer or, indeed, any kind of suitable mobile station or wireless device. Air interface 115 between wireless terminal 110 and wireless network node 120, or a cell of wireless network node 120, may be configured in accordance with a first Radio Access Technology, RAT, which both wireless terminal 110 and wireless network node 120 are configured to support.

Examples of cellular RATs include Long Term Evolution, LTE, New Radio, NR, which may also be known as fifth generation, 5G, radio access technology and MulteFire. On the other hand, examples of non-cellular RATs include Wireless Local Area Network, WLAN, and Worldwide Interoperability for Microwave Access, WiMAX.

In case of cellular RATs, wireless network nodes 120 may be referred to as BSs, or cells of BSs. For example, in the context of LTE, a BS may be referred to as eNB while in the context of NR, a BS may be referred to as gNB. In case of both, LTE and NR, wireless terminal 110 may be referred to as a UE. So concerning FIG. 1, in case of NR for instance, UE 110 may communicate wirelessly with gNB 120, or a cell of first gNB 120, via air interface 115. Also, for example in the context of WLAN, wireless network node 110 may be referred to as an access point. In any case, example embodiments are not restricted to any particular wireless technology.

In some example embodiments, wireless network nodes 120, or cells of wireless network nodes 120, may be referred to as data endpoints of a RAN, wherein the RAN comprises wireless terminals 110 and wireless network nodes 120.

Wireless network nodes 120 may be connected, directly or via at least one intermediate node, with core network 130 via interface 125. An aggregation unit (not shown in FIG. 1) may, or may not, reside in core network 130. Indeed, in many applications the aggregation may not be in core network 130, but the aggregation unit may be connected to wireless networks nodes 120 via core network 130 or via the network operation, management, and other operation support system interfaces directly connected to the radio access network elements. Interface 125 may be a wired link. Core network 130 may be, in turn, coupled via interface 135 with another network (not shown in FIG. 1), via which connectivity to further networks may be obtained, for example via a worldwide interconnection network.

Machine Learning, ML, and Deep Learning, DL, may be used in RANs for control, optimization, scheduling, etc. For instance, ML may be exploited in a RAN for enabling efficient and adaptable control loops for various use cases, such as Multiple-Input Multiple-Output, MIMO, beam control and optimization, scheduling, dynamic localization and/or closed loop optimization of various radio resource control and allocation decision algorithms.

One challenge associated with the use of ML and DL algorithms inside a RAN is that limitations of product platforms need to be taken into account. For example, processing power and memory may be limited. Also, there may be latency requirements which may limit a size of a local or a common model, thereby limiting a scope of input parameters supported by the model. Furthermore, an implementation of an overall DL framework needs to take into consideration a topology of the network, wherein the data endpoints of a RAN, such as wireless network nodes 120, generate data, e.g., training data, or a local model for a common model. A challenge thus is how to obtain training data and local models, and how to determine and distribute common models to similar network nodes in a continuous manner.

In general, in a de-centralized data system, such as in a cellular communication system, it may be desirable to distribute incremental learning tasks to the data endpoints of the RAN, such as wireless network nodes 120, that are close to data sources, such as wireless terminals 110, because total volume of data may be too large to be transmitted to a central location, such as an aggregation unit, for training. Moreover, it may not be desirable to transfer original data from the data endpoints of the RAN to the central location as the original data may be sensitive, e.g., related to access control, UE attributes or measurements.

A de-centralized data system may comprise a set of similar, but possibly not identical, data endpoints, wherein each data endpoint may have their own behaviour of system state which is typically represented by a set of measurable attributes in time series. For instance, in case of a cellular communication network, a RAN may comprise a large number of wireless network nodes 120, such as cells, and each wireless network node 120 may have its own behaviour state, measured by a set of attributes like counters and Key Performance Indicators, KPIs. Said cellular communication network may be a living system in a sense that a status of wireless network node 120 may vary over time, e.g., due to a sudden rise in local traffic volume or a change in a configuration of wireless network node 120. Also, wireless network nodes 120 may differ from each other due to local contexts, such as different radio propagation environment.

Variability of local context of wireless network nodes 120 may pose a challenge for training DL models. For instance, a prediction model trained with input data from a first 5G/NR cell may not provide optimal results for a second 5G/NR cell if input data of the second 5G/NR cell is substantially different compared to the input data of the first 5G/NR cell. On the other hand, if a DL model is trained using input data of a single cell, i.e., local data, it will limit the results to potentially sub-optimal states because the DL model is not trained by taking into account input data of other cells. Hence the model cannot learn from other cells which may have better performance levels. In addition, if training data comes from a single cell, a size of a parameter space may be limited compared to using training data of multiple cells. Therefore, in some example embodiments, training data of multiple cells may be exploited.

In some example embodiments, a ML method may be applied in a cellular communications system, i.e., in a communication-efficient, de-centralised learning system using local and common, i.e., global, models. For instance data samples from all or subset of data endpoints, i.e., wireless network nodes 120, may be collected and transferred to a central training unit, such as an aggregation unit. The central training unit may then create one or more common models, e.g., through a batch mode training, based on the data samples received from data endpoints, such as wireless network nodes 120. Received data may be grouped statically, for example based on domain expert (human) defined grouping rules, such as configuration parameters of wireless network nodes 120 and/or similar geographical context of wireless network nodes 120. A common model may be then trained for each group. The common model may be consequently applied to new time series of existing wireless network nodes 120, or to new wireless network nodes 120, for making predictions.

In such a case, all data samples may need to be transmitted from wireless network node 120 to the central training unit, i.e., aggregation unit, for training. This may be a fundamental restriction at least for some DL based systems, e.g., in 5G era wherein closed loop optimization may be based on very high-resolution time series, such as million second-to-second level attributes. Consequently, some example embodiments further provide a new, distributed and communication efficient learning system for high-resolution time series.

Another challenge is that implementation of a practical DL model for RANs needs to enable optimized handling of the model initiation for new wireless network nodes 120. For instance, it may be desirable that a new wireless network node 120 would start with an initial model which has been trained from, or for, a set of previously operational wireless network nodes 120 which have similar conditions, to avoid starting from the beginning. In general, starting from the beginning with random model parameters should be avoided, because it may prevent a new wireless network node 120 from functioning properly for a period time. In the worst case starting from the beginning may even prevent convergence due to bad initial performance levels.

Furthermore, utilization of ML in cellular RANs may require use of specific behaviour attributes of wireless terminals 110, or end user application specific behaviour attributes, such as radio resource decision algorithms based on predicted traffic, mobility, and/or bandwidth usage models. UE specific behaviour attributes may be obtained through monitoring and measuring each radio bearer in lower layers of radio protocols, e.g., by agents residing in wireless network node 120.

Application specific behaviour attributes may be measured by similar agents residing in wireless network node 120 as well, e.g., monitoring IP flows at different network interfaces and/or gateways. The UE and application specific behaviour attributes may be too large to be transmitted to the central training unit and more importantly, such specific behaviour attributes may be considered as private subscriber data which should be handled with extreme care to fulfil privacy compliance regulations. UE specific behaviour attributes, once learned locally by each wireless network node 120, may be further aggregated and grouped so that UE group level radio resource control and optimization strategies can be inferred and applied. For instance, parameters of local models of wireless network nodes 120 may comprise UE specific behaviour attributes, such as active period, uplink or downlink traffic volume, experienced throughput, and/or application specific behaviour attributes, such as per IP flow package volume, average package size, and nominal bit-rate.

Parameters of common models may hence comprise UE specific behaviour attributes and/or application specific behaviour attributes as well. In general, said parameters may be used for controlling transmission and reception over air interface, such as air interface 115. Consequently, said parameters may be used for transmitting and receiving over air interface, if for example wireless network node 120 allocates radio resources for wireless terminal 110 using said parameters.

Example embodiments of the present invention therefore enable communication-efficient learning between a large number of distributed data endpoints, such as wireless network nodes 120, and exploitation of learned models to improve inference performance at each data endpoint. In some example embodiments, the data endpoint may be a cell level algorithmic unit, like a resource scheduling algorithm in wireless network node 120. Also, a data endpoint may be wireless terminal 110, such as a UE, or a UE group specific algorithmic unit, like radio bearer admission control unit, or association decision unit across multiple UEs and multiple cells.

In some example embodiments, a system may comprise M data endpoints, wherein each data endpoint may comprise a local learning unit and a local inference unit. For example, the learning unit inside each data endpoint may exploit techniques such as Multi-Layer Perceptron, MLP, Long-Short Term Memory, LSTM or Convolutional Neural Network, CNN.

Figure 2:
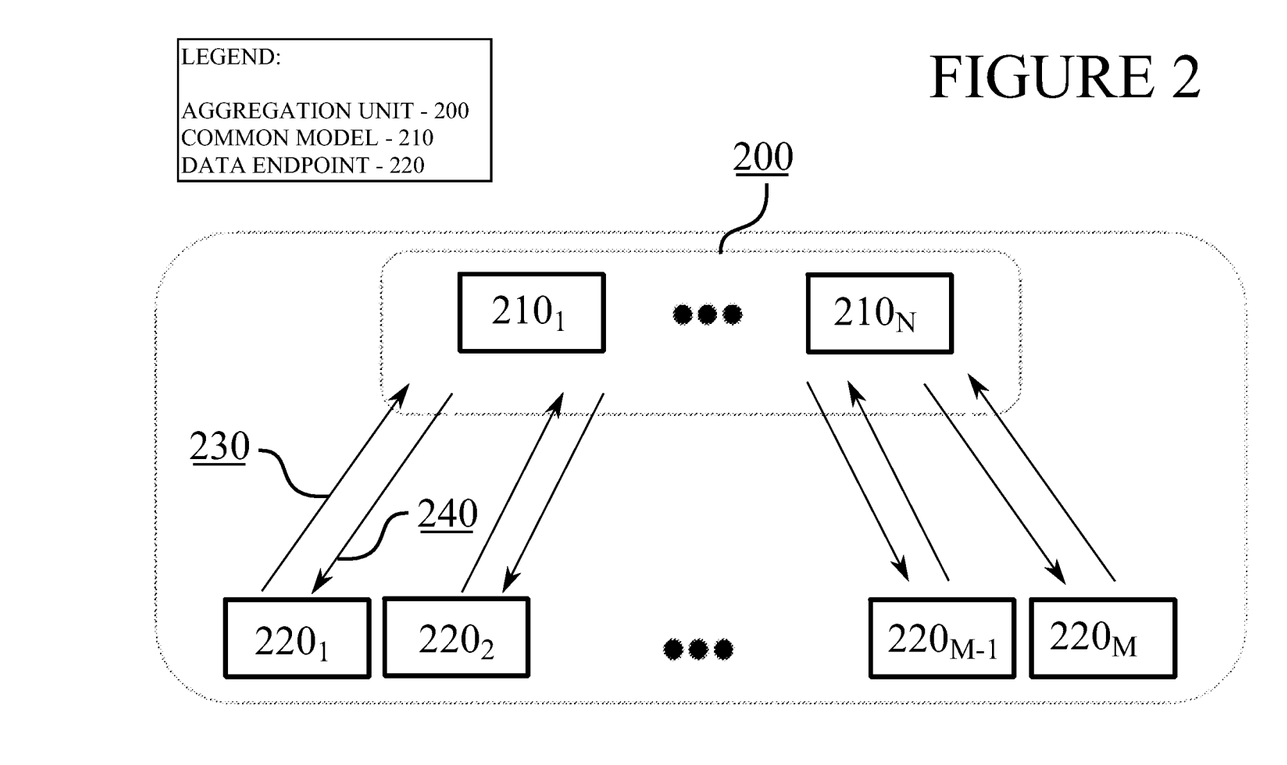
FIG. 2 illustrates an overview of a communication-efficient, de-centralised learning system in accordance with at least some example embodiments of the present invention.

FIG. 2 illustrates an overview of a communication-efficient, de-centralised learning system in accordance with at least some example embodiments of the present invention. The communication-efficient, de-centralised learning system may comprise M data endpoints $220_1$-$220_M$, such as wireless network nodes 120, and N common models $210_1$-$210_N$. Common models $210_1$-$210_N$ may be determined, and possibly stored and distributed, by aggregation unit 200. All of the data endpoints $220_1$-$220_M$ may transfer a trained data model or its representation, at 230, to aggregation unit 200 and receive, at 240, a new or an updated common model or its representation. The trained data model may be referred to as a local model of one data endpoint $220_1$-$220_M$.

In some example embodiments, inference and on-line learning may be performed at each data endpoint $220_1$-$220_M$. For instance, each data endpoint may execute on-line learning, e.g., by means of backpropagation, and keep track of the changes to the local model of the data endpoints $220_1$-$220_M$ in question. The local model from each of the data endpoints $220_1$-$220_M$ may be reported to the aggregation unit 200, for example periodically or when there is a sufficient change in parameters of the local model.

The number of common models N may be derived dynamically by the aggregation unit 200 during aggregation, using an algorithm such as x-means. The number of common models N may be determined using the algorithm once, or revisited periodically.

In some example embodiments, there may be no common model in the aggregation unit 200 in the beginning. Thus, each data endpoint $220_1$-$220_M$ may transmit information about its local model to the central training unit, e.g., the aggregation unit 200, for evaluation. The information about the local model may comprise for example a representation of the local model. The representation of the local model may be a full local model. In addition, the information about the local model may comprise an estimated accuracy of the local model and/or statistical characteristics of input data that was used to generate the local model.

Alternatively, in some example embodiments, snapshots of input data samples from selected data endpoints $220_1$-$220_M$ may be collected for off-line feature investigation and for the aggregation unit 200 to build initial common models for data endpoints $220_1$-$220_M$.

In some example embodiments, architecture of a neural network, such as number of layers, types of each layer and number of neurons, as well as other hyperparameters, such as a learning rate, may be defined using standard techniques like a grid search. For instance, in machine learning, the so-called hyperparameters may be used to define higher level concepts about the model such as complexity, or capacity to learn. Typically, the hyperparameters may be pre-defined. Examples of hyperparameters comprise a number of hidden layers in a deep neural network and the number of clusters in a k-means clustering.

In some example embodiments, the aggregation unit 200 may determine an initial number of common models N. Moreover, the aggregation unit 200 may also determine to which common model a representation of each data endpoint $220_1$-$220_M$ is to be aggregated, e.g., by comparing similarity of matrices in the local models and the common models. That is to say, similarity of local models may refer to having similar parameters in the local models, i.e., a difference between the parameters of a local model of a first data endpoint $220_1$ and a local model of a second data endpoint $220_2$ may be smaller than a threshold.

In some example embodiments, a model topology may be determined. The model topology may be referred as to a relationship, or mapping, between local model of each data endpoint $220_1$-$220_M$ and the corresponding common model $210_1$-$210_N$, to be managed by the aggregation unit 200. The model topology may be derived using a clustering method for example. Upon determining the model topology, the aggregation unit 200 may average the representations of local models of data endpoints $220_1$-$220_M$ for each of the common models $210_1$-$210_N$. The model topology may be dynamic, i.e., vary in time. That is to say, if something changes in the system, the model topology may change as well. Hence, in some example embodiments the model topology may be updated, when needed.

In some example embodiments, the number of common models N may be derived at least partially based on pre-defined domain knowledge. For instance, the number of common models N may be derived at least partially based on 1 model per traffic type, or per cell configuration category. In such a case, the aggregation unit 200 may comprise a function for continuously monitoring the model topology, identifying whether new group(s) should be added, and/or any given data endpoint $220_1$-$220_M$ should be better mapped to a different group. The data endpoints may be involved in the evaluation of suitable mapping by comparing the representation of its own data model against the presentations of data models of the existing groups, and inform the evaluation result to the aggregation unit.

The aggregation unit 200 may group the local models received from the data endpoints $220_1$-$220_M$, i.e., the aggregation unit 200 may group the data endpoints $220_1$-$220_M$ based on the received local models. Grouping may be referred to as clustering as well.

Figure 3:
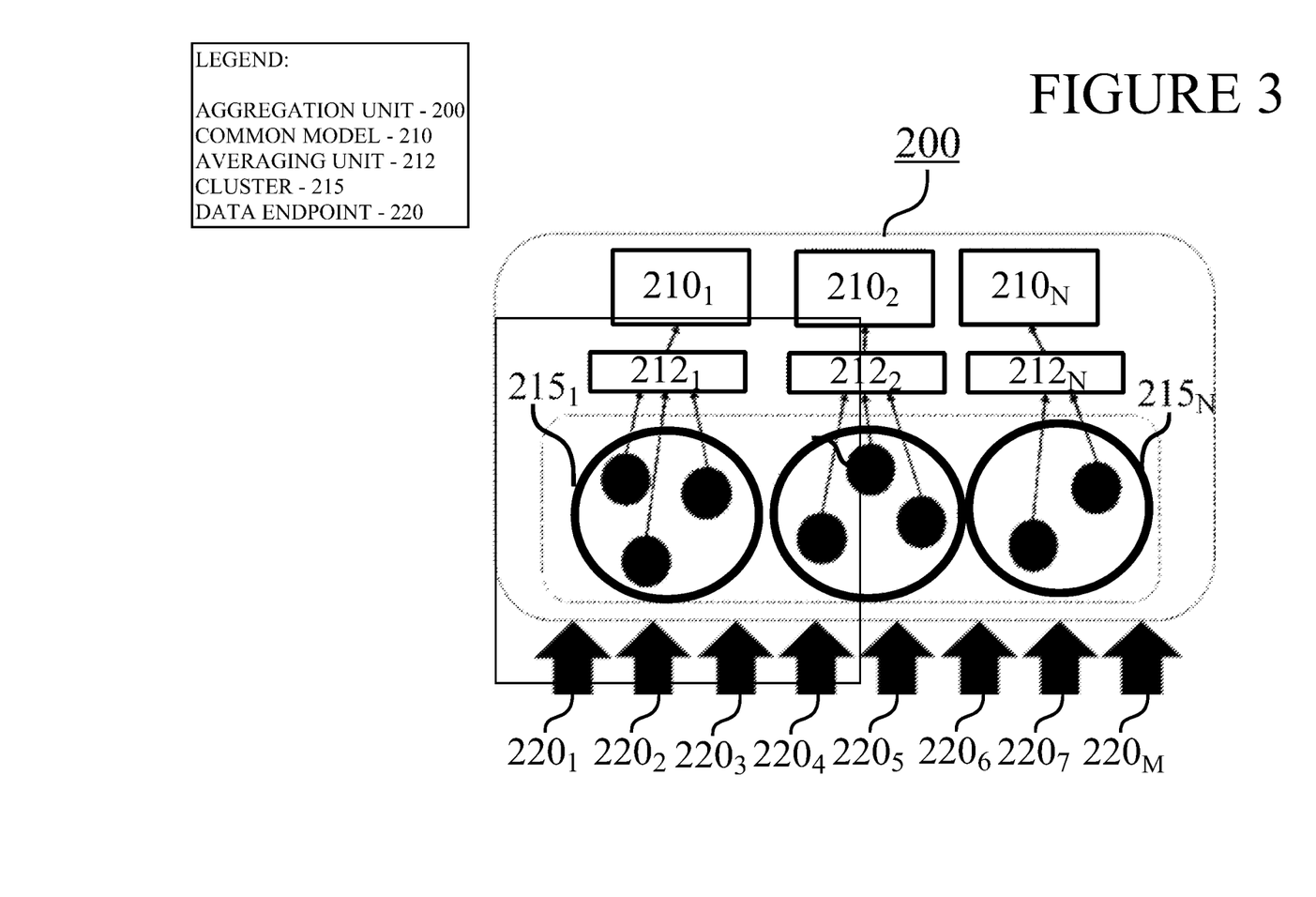
FIG. 3 illustrates grouping of models in accordance with at least some example embodiments of the present invention.

FIG. 3 illustrates grouping of models in accordance with at least some example embodiments of the present invention. FIG. 3 shows common models $210_1$-$210_N$, averaging units $212_1$-$212_N$, groups, i.e., clusters $215_1$-$215_N$, and data coming from data endpoints $220_1$-$220_M$. As shown in FIG. 3, each group $215_1$-$215_N$ may be mapped to one common model $210_1$-$210_N$. That is to say, one common model is associated with one group, i.e., cluster.

Grouping may be based on various criteria. For example, grouping may be based on matrix elements of the local models of data endpoints $220_1$-$220_M$. In such a case all or a subset of the matrix elements may be used for grouping. Alternatively, or in addition, statistical characteristics of input data that was used to generate the local model of each data endpoint $220_1$-$220_M$ may be used. For grouping, the aggregation unit 200 may use different algorithms, such as k-means, x-means, or Support Vector Machine, SVM.

Moreover, in some example embodiments, similarity assessment of data endpoints $220_1$-$220_M$ may be performed by the aggregation unit 200 for grouping, based on local models and/or input data of local models of data endpoints $220_1$-$220_M$ for example. For instance, for model-based similarity assessment, the local models of data endpoints $220_1$-$220_M$ that may be used in inference may be compared. As an example, weights in a first layer of a local model may be used for grouping the local models of data endpoints $220_1$-$220_M$, and consequently for grouping data endpoints $220_1$-$220_M$, into common models $210_1$-$210_N$. In such case, the weights may need to be sent to the aggregation unit 200.

For an input data-based similarity assessment, a characterization of input data of common models $210_1$-$210_N$, such as data fingerprint, may be sent by each data endpoints $220_1$-$220_M$ to the aggregation unit 200. Said characterization of input data may represent a snapshot of characteristics of input data of one data endpoints $220_1$-$220_M$, for example for a given sampling interval.

For instance, the representations of local models of data endpoints $220_1$-$220_M$ may be first mapped to their corresponding common models $210_1$-$210_N$. Then, averaging may be performed by averaging units for each of the common models $210_1$-$210_N$. Then, the averaged common models $210_1$-$210_N$ may be transmitted to data endpoints $220_1$-$220_M$, possibly for a next iteration of local learning at data endpoints $220_1$-$220_M$.

In some example embodiments, N common models may be transmitted back, i.e., distributed, to the data endpoints $220_1$-$220_M$. Also, the N common models may be used for initialization of new data endpoints.

Figure 4:
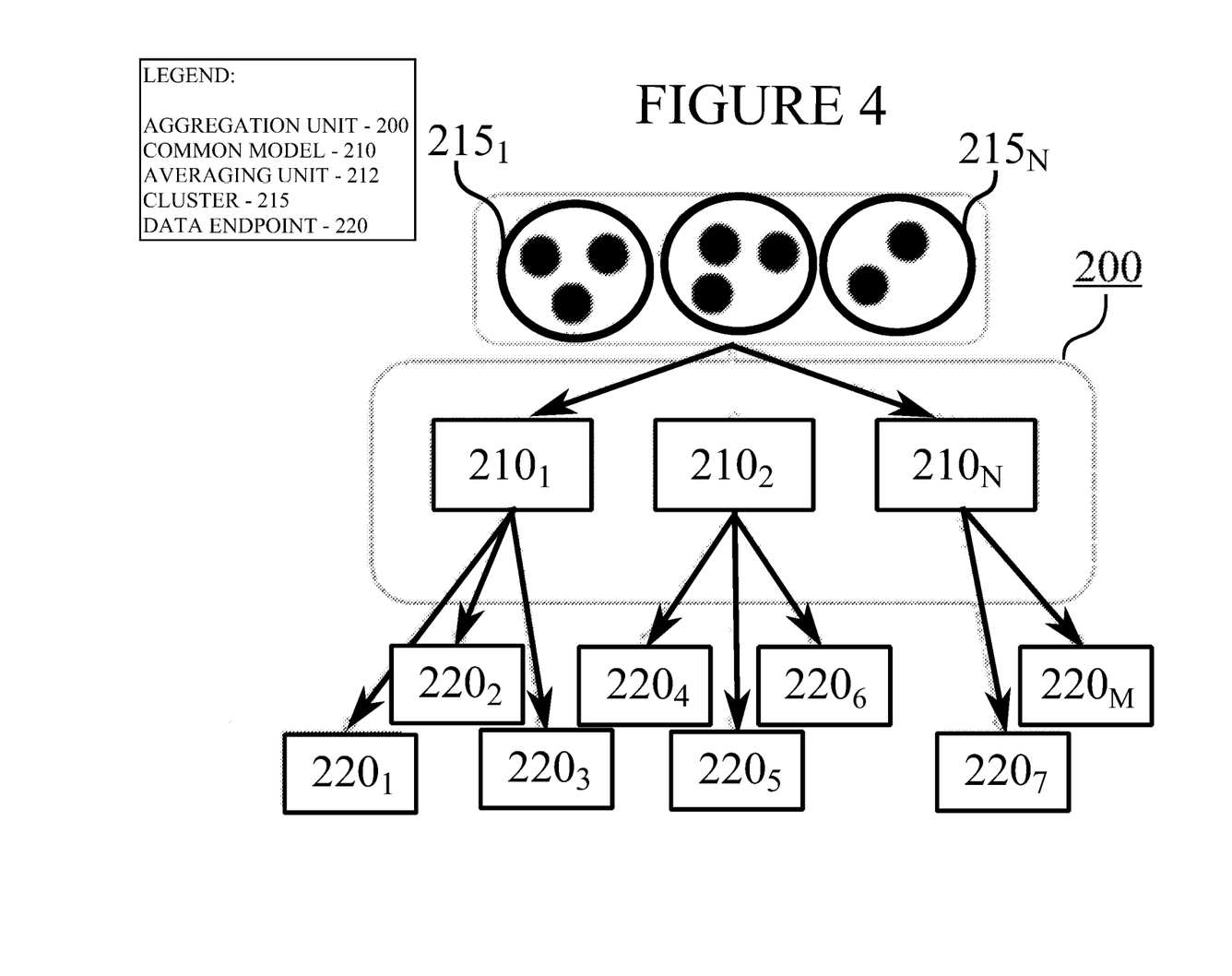
FIG. 4 illustrates distribution of models in accordance with at least some example embodiments of the present invention.

FIG. 4 illustrates distribution of models in accordance with at least some example embodiments of the present invention. As shown in FIG. 4, each cluster, i.e., group $215_1$-$215_N$ may be associated with one common model $210_1$-$210_N$ and each common model $210_1$-$210_N$ may be associated with one or more data endpoints $220_1$-$220_M$. For instance, common model $210_1$ is associated with data endpoints $220_1$-$220_3$, and data endpoints $220_1$-$220_3$ are in group $215_1$.

A common model may be distributed to at least one of the data endpoints $220_1$-$220_M$ to improve the local model learning and convergence in the next iteration, and/or to run its inference on the local data in at least one of the data endpoints $220_1$-$220_M$ and/or to be used as the initial model for a newly deployed data endpoint for both inference and for incremental learning in the new data endpoint.

So for example first data endpoint $220_1$ may receive, from aggregation unit 200, a common model for first data endpoint $220_1$. Upon receiving the common model, first data endpoint $220_1$ may determine whether to use its local model or the received common model, i.e., first data endpoint $220_1$ may select the local model or the received common model for example for adapting communication parameters based on the selected model. Then, first data endpoint $220_1$ may, based on the determination, use the local model or the common model for performing wireless communication algorithmic computations, for instance, making a time series prediction of system load, or making the optimal selection of communication schemes or system parameter combination. Thus, first data endpoint $220_1$ may communicate over an air interface using the communication parameters. Said communication parameters may comprise, e.g., transmission power, modulation and coding scheme, etc.

In general, local and common models may be used for controlling transmission and reception over air interface, such as air interface 115 of FIG. 1. So for example first data endpoint $220_1$ may control, based on the determination whether to use a local model of the first data endpoint of the RAN or the common model, transmission and reception over air interface. Said controlling may comprise, e.g., adapting control loops, beams and/or allocation of radio resources. Therefore, a transmitter and a receiver may be configured for communicating over air interface based on the selected local model or the received common model.

That is to say, for example first data endpoint $220_1$ may allocate radio resources for transmitting and/or receiving over air interface based on a model selected by first data endpoint $220_1$, such as the local model of first data endpoint $220_1$ or the common model received by first data endpoint $220_1$. In some embodiments of the present invention, communicating is used to cover both, transmitting and receiving. In general, transmission may be performed using transmitter 530 of FIG. 5 and reception may be performed using receiver 540 of FIG. 5. Hence, first data endpoint $220_1$ may use the selected model for communicating over air interface.

In some example embodiments, first data endpoint $220_1$ may determine that the local model is to be used instead of the received common model and in such a case first data endpoint $220_1$ may use the local model for performing wireless communication.

Moreover, in some example embodiments, first data endpoint $220_1$ may compare its local model to the received common model. Comparison of local and common models may comprise comparison of parameters of local and common models. Then, first data endpoint $220_1$ may determine, based on the comparison, whether to use the local model or the received common model. For instance, first data endpoint $220_1$ may determine based on the comparison that its local model is more accurate than the common model and then use the local model for performing wireless communication. Such accuracy maybe obtained by comparing the predicted values with the actual received values in the data endpoint. Consequently, first data endpoint $220_1$ may use the local model for adapting communication parameters and communicating over an air interface using the communication parameters.

In some example embodiments, a model updating procedure may be exploited so that after initialization of common models $210_1$-$210_N$ the system may continue learning in a decentralized manner. For instance, averaging may be performed across representations within a group, e.g., based on the model topology, and the corresponding common model associated with said group may then be updated.

In some example embodiments, changes to a previous local model of each data endpoint $220_1$-$220_M$ may be utilized for updating the common models $210_1$-$210_N$, thereby avoiding transmitting all the original data of each data endpoint $220_1$-$220_M$ to the central training unit, e.g., to the aggregation unit 200 of FIG. 2.

In some example embodiments, for both, grouping based on local models and input data of local models of data endpoints $220_1$-$220_M$, the local models of data endpoints $220_1$-$220_M$ may need to be sent to the aggregation unit 200 if mapping from data endpoints $220_1$-$220_M$ to common models $210_1$-$210_N$ changes. However, in some example embodiments, it may be sufficient to send updates of the local models of data endpoints $220_1$-$220_M$ to the aggregation unit 200.

In some example embodiments, a representation of a local model of each data endpoint $220_1$-$220_M$ may comprise an actual inference model or changes to a previous local model due to local on-line learning. If the representation of the local model comprises changes compared to the previous local model, the changes from various data endpoints $220_1$-$220_M$ may be summed and the common model may be determined based on summed changes. The determined common model may be then transmitted to data endpoints $220_1$-$220_M$. In some example embodiments, this may require that all the common models are updated simultaneously.

Common models may be updated in various ways. In some example embodiments, the model topology may be determined dynamically during each update procedure. According to a first example method, data endpoints $220_1$-$220_M$ may send entire local models to aggregation unit 200 for aggregation. Then, averaging may be performed across representations within each group to determine update common models. The first example method may be used, e.g., if all local models of data endpoints $220_1$-$220_M$ are not updated after aggregation and distribution.

According to a second example method, a single baseline model may be defined in the beginning. Then, data endpoints $220_1$-$220_M$ may perform on-line learning in a distributed fashion and send updates to local models of data endpoints $220_1$-$220_M$ to aggregation unit 200 for aggregation. Said updates to local models may comprise updates relative to the single baseline model, i.e., the differences compared to the single baseline model.

Upon receiving the updates to local models, aggregation unit 200 may perform grouping and averaging for the updates, and for each common model, associated with a group, aggregation unit 200 may determine an updated common model by adding averages of the updates of one group to the single baseline model. Then, aggregation unit 200 may send differences of each common model, with respect to the single baseline model, to data endpoints 220$_1$-220$_M$. Data endpoints 220$_1$-220$_M$ may then update local model by adding the differences to the single baseline model. In some example embodiments, updating may be done at a suitably chosen speed, e.g., periodically once every fixed time interval, or every batch of pre-defined time series samples.

For each common model updates from individual data endpoints of the associated group may be summed, for example updates from endpoints 220$_1$-220$_3$ may be summed for the common model 210$_1$ as endpoints 220$_1$-220$_3$ may be within the group 215$_1$, as shown in FIG. 3. Thus, N updated common models may be acquired as a result. In some example embodiments, the total number of common models N and the association of each data endpoint 220$_1$-220$_M$ to a specific common model 210$_1$-210$_N$ may be selected dynamically. In some example embodiments, a model clustering method may be used for grouping data endpoints 220$_1$-220$_M$.

In some example embodiments, the updates from data endpoints 220$_1$-220$_M$ may be averaged and applied for each of the common models 210$_1$-210$_N$ if mapping from data endpoints 220$_1$-220$_M$ to the common models 210$_1$-210$_N$. However, if mapping of at least one data endpoint 220$_1$-220$_M$ has changed, the model topology may be updated accordingly and the at least one data endpoint 220$_1$-220$_M$ may be added to the new group.

In some example embodiments, accuracy may be improved for local models of the data endpoints 220$_1$-220$_M$ by changing hyperparameters of the local models. Said changing may be performed by using standard methods for identifying the adequate hyperparameters. A system may then be re-initialized using the same steps as when the system is taken into use for the first time.

In some example embodiments, the same topology model may be used in the updating procedure and the updated common models 210$_1$-210$_N$ may be distributed to the same data endpoints 220$_1$-220$_M$, from which updates were collected for updating the common models 210$_1$-210$_N$, for performing inference, and/or used as the baseline for next iteration of learning. On the other hand, in some example embodiments, the updated common model may be distributed to different data endpoints than data endpoints 220$_1$-220$_M$, from which updates were collected for updating the common models 210$_1$-210$_N$ if the model topology has changed. Alternatively, or in addition, in some example embodiments the local model of at least one data endpoint 220$_1$-220$_M$ may not be replaced with the updated common model, if the accuracy of the current local model is high enough and the updated common model has lower accuracy for the end-point specific data.

In some example embodiments, a new data endpoint may be added to the system. For every new data endpoint added to the system, a deterministic algorithm may be used for selecting the most suitable common model to be dispatched to the new data endpoint, to be used as an initial local model by the new data endpoint. The deterministic selection algorithm may be located in the central entity, such as aggregation unit 200. Moreover, the deterministic selection algorithm may be based on for instance, the most frequently distributed model, or based on data endpoint configuration parameters, location similarity of the new data endpoint, estimated traffic and cell load conditions etc.

In some example embodiments, learning of wireless terminal 110 specific models, such as time series profiles of application traffic of wireless terminal 110, may be exploited. Mapping of the model topology, from M to N, may still be applied but a learning function of each of data endpoints 220$_1$-220$_M$ may cover more than 1 local model. For example, multiple wireless terminals 110 may be connected to one wireless network node 120 and said multiple wireless terminals 110 may be using different applications. In such a case, the aggregation unit 200 may need to distribute more than one common model 210$_1$-210$_N$ to one data endpoint for the next iteration of learning.

Example embodiments make it possible for all data endpoints 220$_1$-220$_M$ to perform continuous learning locally, for capturing dynamic changes in every data endpoint 220$_1$-220$_M$, and all the data may be utilized by the aggregation unit 200 for making intelligent updates to the common models 210$_1$-210$_N$. Furthermore, the use of the aggregation unit 200, for example in a central unit, enables grouping of similar data endpoints 220$_1$-220$_M$ to one group, thereby making it possible to achieve better matched common models 210$_1$-210$_N$ compared to performing simple linear averaging of model parameters.

Also, example embodiments of the present invention provide more optimized initial models for new data endpoints. Common models may be used for obtaining good initial local models for new data endpoints, thereby making it possible for a new data endpoint to settle to the most optimal operational and performance state much quicker than, e.g., starting from a random position in the local model initiation. This is beneficial for both achieving good inference result immediately as well as for training of the local model inside the new data endpoint.

In some example embodiments, a dynamic learning method may be provided. The dynamic learning method may comprise use of multiple common models 210$_1$-210$_N$, which makes it possible to keep a size of one common model small compared to a case, wherein only one common model would be used. This expedites inference, and in many cases, improves the accuracy and hence performance of the local models. In some example embodiments, dynamic aggregation may be exploited to allow adaptation to changes in input data, resulting often in faster convergence of the parameters of local models. Dynamic aggregation may also adapt automatically to changes in network topology. For example, if a new wireless network node 120 is added, no changes are needed for using it in aggregation and distribution.

Figure 5:
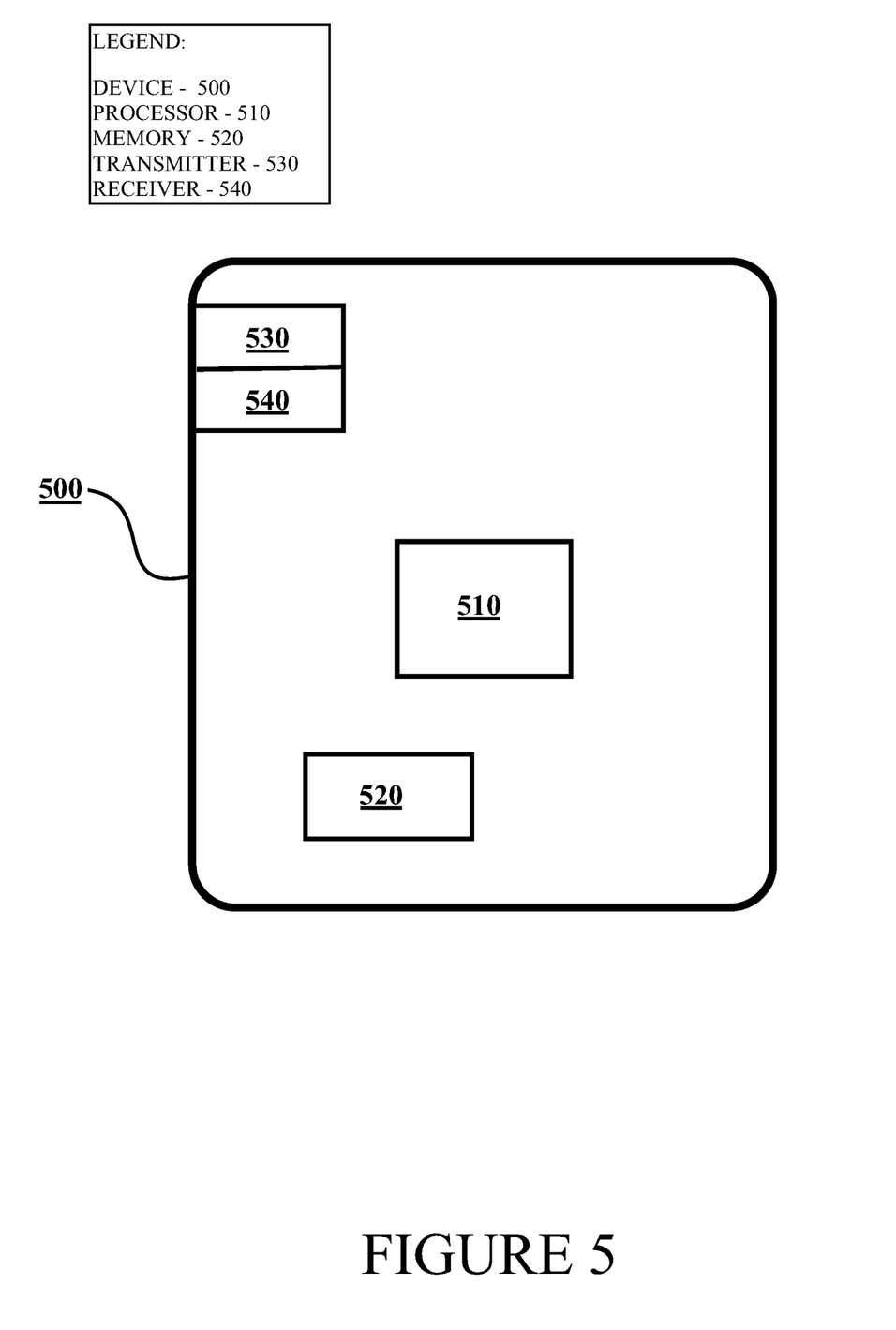
FIG. 5 illustrates an example apparatus capable of supporting at least some example embodiments of the present invention.

FIG. 5 illustrates an example apparatus capable of supporting at least some example embodiments. Illustrated is device 500, which may comprise, for example, aggregation unit 200, first data endpoint 220$_1$, or a device controlling functioning thereof. Comprised in device 500 is processor 510, which may comprise, for example, a single- or multi-core processor wherein a single-core processor comprises one processing core and a multi-core processor comprises more than one processing core. Processor 510 may comprise, in general, a control device. Processor 510 may be means for performing method steps in device 500. Processor 510 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 500 may comprise memory 520. Memory 520 may comprise random-access memory and/or permanent memory. Memory 520 may comprise at least one RAM chip. Memory 520 may comprise solid-state, magnetic, optical and/or holographic memory, for example. Memory 520 may be at least in part accessible to processor 510. Memory 520 may be at least in part comprised in processor 510. Memory 520 may be means for storing information. Memory 520 may comprise computer instructions that processor 510 is configured to execute. When computer instructions configured to cause processor 510 to perform certain actions are stored in memory 520, and device 500 overall is configured to run under the direction of processor 510 using computer instructions from memory 520, processor 510 and/or its at least one processing core may be considered to be configured to perform said certain actions. Memory 520 may be at least in part comprised in processor 510. Memory 520 may be at least in part external to device 500 but accessible to device 500.

Device 500 may comprise a transmitter 530. Device 500 may comprise a receiver 540. Transmitter 530 and receiver 540 may be configured to transmit and receive, respectively.

Processor 510 may be furnished with a transmitter arranged to output information from processor 510, via electrical leads internal to device 500, to other devices comprised in device 500. Such a transmitter may comprise a serial bus transmitter arranged to, for example, output information via at least one electrical lead to memory 520 for storage therein. Alternatively to a serial bus, the transmitter may comprise a parallel bus transmitter. Likewise processor 510 may comprise a receiver arranged to receive information in processor 510, via electrical leads internal to device 500, from other devices comprised in device 500. Such a receiver may comprise a serial bus receiver arranged to, for example, receive information via at least one electrical lead from receiver 540 for processing in processor 510. Alternatively to a serial bus, the receiver may comprise a parallel bus receiver.

Processor 510, memory 520, transmitter 530 and receiver 540 may be interconnected by electrical leads internal to device 500 in a multitude of different ways. For example, each of the aforementioned devices may be separately connected to a master bus internal to device 500, to allow for the devices to exchange information. However, as the skilled person will appreciate, this is only one example and depending on the example embodiment various ways of interconnecting at least two of the aforementioned devices may be selected without departing from the scope of the example embodiments.

Figure 6:
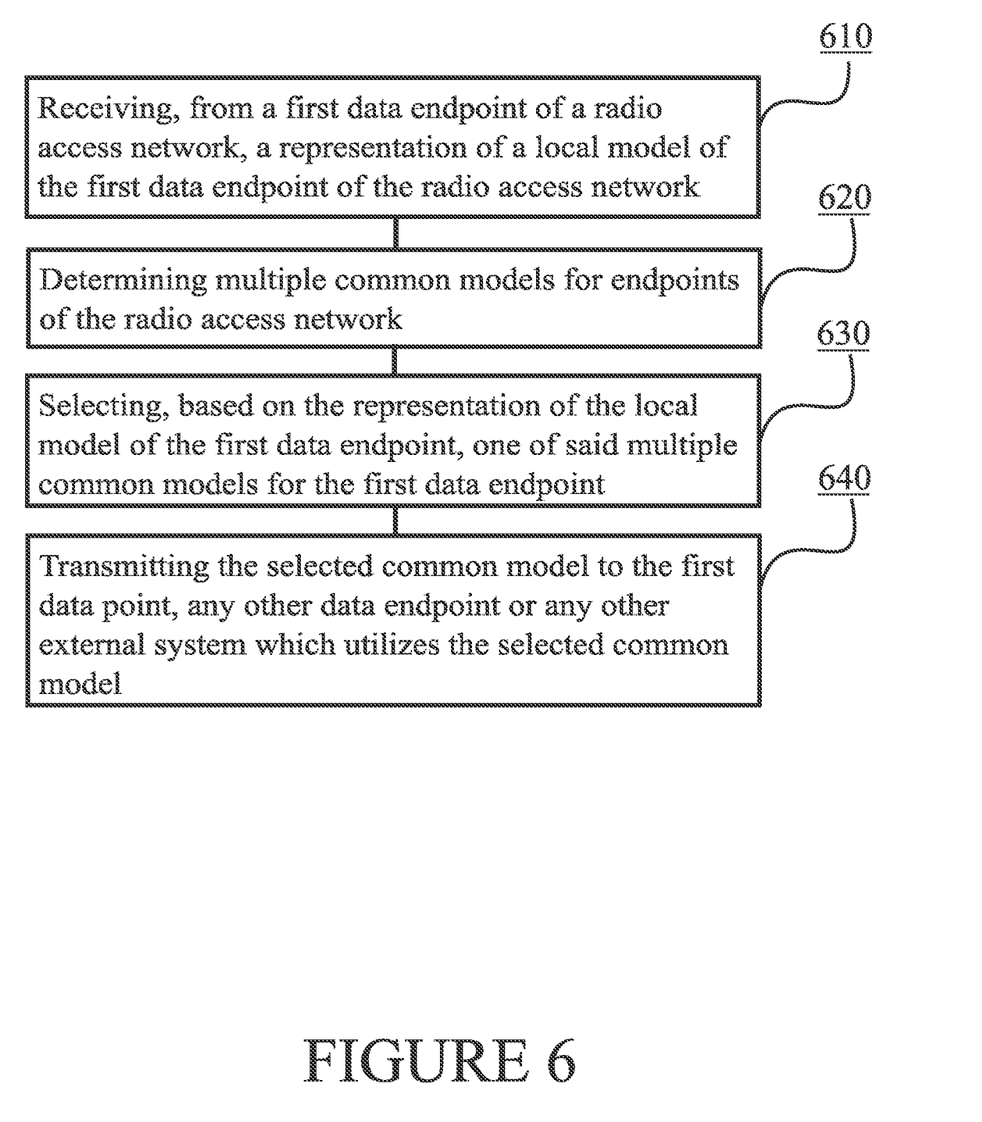
FIG. 6 illustrates a flow graph of a first method in accordance with at least some example embodiments of the present invention.

FIG. 6 is a flow graph of a first method in accordance with at least some example embodiments of the present invention. The phases of the illustrated first method may be performed by aggregation unit 200 or by a control device configured to control the functioning thereof, possibly when installed therein.

The first method may comprise, at step 610, receiving, from a first data endpoint of a radio access network, a representation of a local model of the first data endpoint of the radio access network. The first method may also comprise, at step 620, determining multiple common models for endpoints of a radio access network. In addition, the first method may comprise, at step 630, selecting, based on the representation of the local model of the first data endpoint, one of said multiple common models for the first data endpoint. Finally, the first method may comprise, at step 640, transmitting the selected common model to the first data endpoint, any other data endpoint or any other external system which utilises the selected common model.

Figure 7:
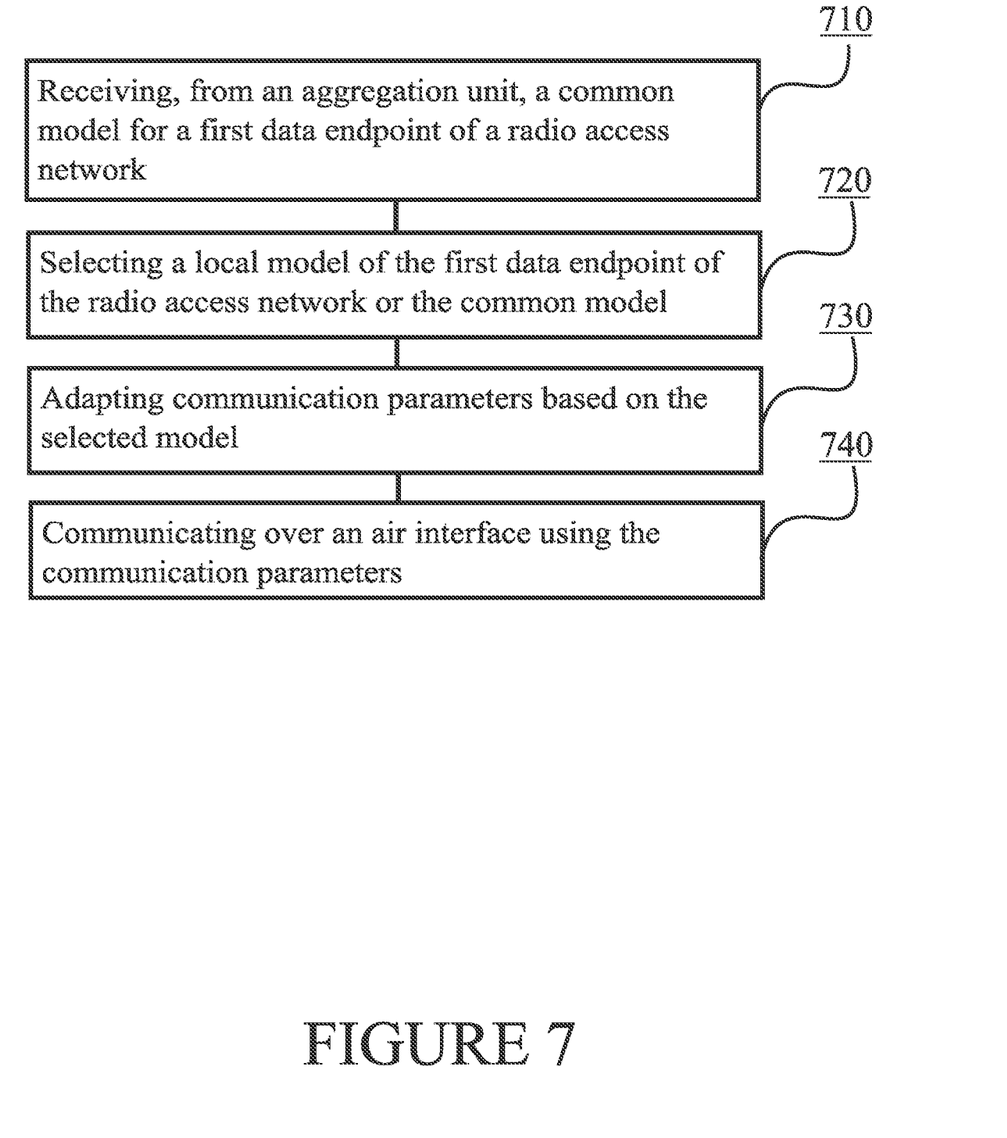
FIG. 7 illustrates a flow graph of a second method in accordance with at least some example embodiments of the present invention.

FIG. 7 is a flow graph of a second method in accordance with at least some example embodiments of the present invention. The phases of the illustrated second method may be performed by first data endpoint $220_1$ or by a control device configured to control the functioning thereof, possibly when installed therein. First data endpoint $220_1$ may refer to, for example, wireless terminal 110 or wireless network node 120.

The second method may comprise, at step 710, receiving, from an aggregation unit, a common model for a first data endpoint of a radio access network. The second method may also comprise, at step 720, selecting a local model of the first data endpoint of the radio access network or the common model. In addition, the second method may comprise, at step 730, adapting communication parameters based on the selected model. Finally, the second method may comprise, at step 740, communicating over an air interface using the communication parameters.

It is to be understood that the example embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment of the present invention. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and example of the present invention may be referred to herein along with alternatives for the various components thereof. It is understood that such example embodiments, examples, and alternatives are not to be construed as de facto equivalents of one another, but are to be considered as separate and autonomous representations of the present invention.

In an exemplary example embodiment, an apparatus, such as, for example, aggregation unit 200 or first data endpoint 220₁, may comprise means for carrying out the example embodiments described above and any combination thereof.

In an exemplary example embodiment, a computer program may be configured to cause a method in accordance with the example embodiments described above and any combination thereof. In an exemplary example embodiment, a computer program product, embodied on a non-transitory computer readable medium, may be configured to control a processor to perform a process comprising the example embodiments described above and any combination thereof.

In an exemplary example embodiment, an apparatus, such as, for example, aggregation unit 200 or first data endpoint $220_1$, may comprise at least one processor, and at least one memory including computer program code, wherein the at least one memory and the computer program code are configured to, with the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments of the present invention find industrial application in cellular communication networks, such as, for example, in 5G/NR radio access networks.

ACRONYMS LIST

BS Base Station
CNN Convolutional Neural Network
DL Deep Learning
GSM Global System for Mobile communication
IoT Internet of Things
KPI Key Performance Indicator
LTE Long-Term Evolution
LTSM Long-Short Term Memory
M2M Machine-to-Machine
MIMO Multiple-Input Multiple-Output
ML Machine Learning
MLP Multi-Layer Perceptron
NR New Radio
RAN Radio Access Network
RAT Radio Access Technology
SVM Support Vector Machine
UE User Equipment
UI User Interface
WCDMA Wideband Code Division Multiple Access
WiMAX Worldwide Interoperability for Microwave Access
WLAN Wireless Local Area Network

| REFERENCE SIGNS LIST | |
|---|---|
| 110 | Wireless terminal |
| 115, 125, 135 | Interfaces |
| 120 | Wireless network node |
| 130 | Core network |
| 130 | Second network element, e.g., law-enforcement agency |
| 140 | Third network element, e.g., justice authority |
| 200 | Aggregation unit |
| $210_1$-$210_N$ | Common models |
| $212_1$-$212_N$ | Averaging units |
| $215_1$-$215_N$ | Groups, i.e., clusters |
| $220_1$-$220_M$ | Data endpoints |
| 230 | transmission of local model |
| 240 | transmission of common model |
| 500-540 | Structure of the apparatus of FIG. 5 |
| 610-640 | Phases of the method of FIG. 6 |
| 710-740 | Phases of the method of FIG. 7 |

The invention claimed is:

1. A method to be performed by an aggregation unit, comprising:
   receiving data samples from a plurality of wireless network nodes of a radio access network, wherein one or more of the wireless network nodes comprise base stations or access points of the radio access network;
   creating a plurality of common models based on the data samples trained to adapt communication parameters within the radio access network;
   receiving, from the wireless network nodes, representations of local models trained at the wireless network nodes to adapt the communication parameters within the radio access network;
   grouping the wireless network nodes into groups based on similarities of the local models of the wireless network nodes;
   mapping each of the groups to one of the common models; and
   distributing the common models to the wireless network nodes based on the mapping between the groups and the common models to allocate radio resources at the wireless network nodes for transmitting and/or receiving over an air interface using the communication parameters from the common model or the local model.

2. A method according to claim 1, wherein:
grouping the wireless network nodes comprises grouping the wireless network nodes into the groups based on weights in a first layer of the local models of the wireless network nodes.

3. A method according to claim 1, wherein:
grouping the wireless network nodes comprises grouping the wireless network nodes into the groups based on similarities of input data of the local models of the wireless network nodes.

4. A method according to claim 1, further comprising:
updating the common models by averaging the representations of the local models for the wireless network nodes in the respective groups.

5. A method according to claim 1, wherein the representations of the local models comprise information about changed parameters compared to previous local models of the wireless network nodes, and the common models are determined based on the changed parameters.

6. A method according to claim 1, further comprising:
receiving, at a wireless network node of the wireless network nodes, a common model mapped to a group for the wireless network node;
selecting, at the wireless network node, a local model of the wireless network node or the common model;
adapting the communication parameters based on the selected model; and
communicating over the air interface using the communication parameters.

7. A method according to claim 6, further comprising:
determining that the local model is to be used instead of the common model; and
using, based on the determination, the local model for communicating over the air interface.

8. A method according to claim 7, wherein said selecting the local model or the common model further comprises:
comparing the local model to the common model; and
determining, based on the comparison, whether to use the local model or the common model.

9. A method according to claim 8, further comprising:
determining, based on the comparison, that the local model is more accurate than the common model, wherein said comparison comprises comparing the local model and the common model with actual data; and
using, based on the determination, the local model for communicating over the air interface.

10. A method according to claim 6, wherein adapting the communication parameters based on the selected model comprises:
allocating the radio resources at the wireless network node for transmitting and/or receiving over the air interface based on the selected model.

11. A method according to claim 1, wherein:
a number of the common models is derived based on one common model per traffic type.

12. A method according to claim 1, wherein:
a number of the common models is derived based on one common model per cell configuration category.

13. A method according to claim 1, further comprising:
selecting one of the common models to be used as an initial local model by a new wireless network node based on a deterministic algorithm.

14. An apparatus, comprising:
at least one processor; and
at least one memory including computer program code;
wherein the at least one memory and the computer program code are configured to, with the at least one processor, cause the apparatus at least to:
receive data samples from a plurality of wireless network nodes of a radio access network, wherein one or more of the wireless network nodes comprise base stations or access points of the radio access network;
create a plurality of common models based on the data samples trained to adapt communication parameters within the radio access network;
receive, from the wireless network nodes, representations of local models trained at the wireless network nodes to adapt the communication parameters within the radio access network;
group the wireless network nodes into groups based on similarities of the local models of the wireless network nodes;
map each of the groups to one of the common models; and
distribute the common models to the wireless network nodes based on the mapping between the groups and the common models to allocate radio resources at the wireless network nodes for transmitting and/or receiving over an air interface using the communication parameters from the common model or the local model.

* * * * *